April 25, 1950  W. F. ALLENBY  2,505,026
ARMATURE
Original Filed Aug. 31, 1944
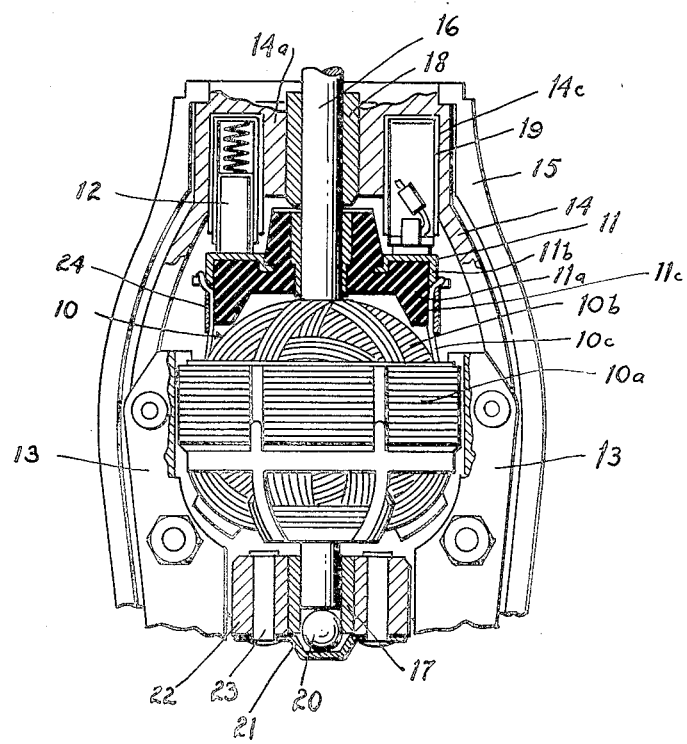
INVENTOR.
William F. Allenby
BY Johnson, Kuno+Kensel
ATTORNEYS Patented Apr. 25, 1950

2,505,026

UNITED STATES PATENT OFFICE 2,505,026

ARMATURE

William F. Allenby, Stratford, Conn., assignor to Casco Products Corporation, Bridgeport, Conn., a corporation of Connecticut Original application August 31, 1944, Serial No. 552,185. Divided and this application May 10, 1946, Serial No. 668,798

5 Claims. (Cl. 172—36)

This invention relates to small handheld electric power tools, and more particularly to improvements in the armature of the motor thereof. This application is a division of my application, Serial No. 552,185, filed August 31, 1944 which issued as Patent No. 2,436,540 on February 24, 1948.

It is an object of the present invention to provide means for preventing the leads extending from the armature coils to the commutators from vibrating excessively and breaking loose their solder connection to the commutators.

This is accomplished according to the present invention by providing a rigidly mounted supporting band between the commutator and armature coils to which band the lead wires from the armature are bound. In the illustrated embodiment of the invention the supporting band is made as an integral part of the molded commutator body, so that the lead wires may be secured to the commutator structure by a strong vibration-resistant binding in addition to the soldered electrical connections commonly employed, which latter, if not reinforced by additional means, often work loose when subjected to vibrating forces because of variations in soldering technique and skill employed.

Other features and advantages will hereinafter appear.

In the accompanying drawing:

The figure shows a view partly in section of the armature.

Referring to the drawing, the motor of the present invention has an armature 10 and a disk commutator 11, the latter being engaged by brushes 12. The motor has a field structure 13 overlying the sides thereof and provided with a field coil, not shown, for cooperating with the armature.

The motor is mounted in a subframe 14 disposed within a casing 15. The armature 10 of the motor is carried by a shaft 16 journaled in bearing sleeves 17 and 18, the latter being press fitted into the portion 14a of the subframe. The subframe 14 is provided with a pair of recesses 14c in which the brushes 12 are carried, the latter being press fitted into the recesses with strip insulation 19, as shown in the drawings. Accordingly, the brushes 12 will be maintained in accurate alignment regardless of the working stresses existing in the motor since the brushes are carried by a rigid cast metal.

At the lower end of the shaft 16 an improved wear-resistant thrust bearing is provided in the form of a hardened steel ball 20 having a diameter substantially equal to that of the shaft 16 and engaging the ground end surface of the latter. A cupped thrust plate 21 is secured to a bearing block 22 by means of rivets 23 and the cupped portion of the plate nesting the ball 20 and retaining the latter in position wherein it engages not only the plate and shaft, but the inner surface of the bearing sleeve 17. During rotation of the shaft the ball which is free to rotate will be continuously turning in various directions as determined by the changing stresses on it and therefore the wearing of the ball will take place uniformly, thus providing a sturdy bearing structure having a long life.

The improved armature and commutator assembly of the present invention is provided wherein the lead wires from the armature coils 10b may be securely bound at the points where they extend from the coils to the commutator 11, thereby preventing loosening of the leads throughout the useful life of the motor.

As shown in the drawing, the commutator 11 which is of the disk type comprises a molded hub 11a having embedded metal segments 11b to which the armature leads 10c are soldered. The molded hub 11a in the commutator is provided with an integral skirt 11c extending toward the armature laminations 10a and enclosing a portion of the windings 10b.

The armature lead wires 10c extend from the coils 10b at a point substantially directly opposite to the periphery of the skirt 11c, overlie the skirt and pass to the commutator segments 11b. Thus it will be seen that the wires, extending through the shortest path possible to the commutator, will have a minimum length. This tends to minimize the flexing of the wire due to centrifugal force as the motor accelerates or decelerates. The lead wires 10c are securely bound to the skirt 11c by a strip of adhesive tape or equivalent binding 24 which is wrapped around the wires and the skirt to bind the wires securely thereto. When tape is used, it is preferable that it be lapped on itself for approximately one-half turn to securely fasten the leads in position. At the time that the armature assembly is completed, including the placing of the tape 24, the entire assembly is dipped in varnish and baked, thereby causing the binding to be securely held in place. The leads thus securely bound against the skirt 11c eliminate unsupported stretches of wire which might, as a result of severe vibrations during continued use of the motor, ultimately break free from the commutator segments or because of fatigue in the wire resulting from vibrations and flexing thereof during the operation of the motor will cause a breakage in the wire and a failure of the motor.

Variations and modifications may be made within the scope of this invention and portions of the improvements may be used without others.

I claim:

1. In an electric motor, a rotatable armature, including a shaft, and a commutator and windings coaxially mounted on the shaft; a cylindrical member of rigid insulating material rigidly secured to said shaft between the said commutator and windings; lead wires extending from the windings exteriorly past the periphery of the cylindrical member to the commutator; and a tape binding the lead wires against said periphery to prevent dislocation of said wires.

2. In an electric motor, a rotatable armature including a commutator and windings disposed axially of the commutator, wound on magnetic core means and having a portion of substantially convex shape extended toward the commutator; a band of rigid insulating material rigidly secured to the commutator, extending about the said convex portion of the windings to protect same, said band having an external peripheral portion located between the commutator and the core means; lead wires extending from the windings past the peripheral portion of the insulating band to the commutator; and means for binding the lead wires against the said peripheral portion of the band to prevent dislocation of said wires.

3. The invention as defined in claim 2, in which the commutator comprises a hub of rigid insulating material and metallic segments embedded in said hub, and in which the band of insulating material is integral with the said hub.

4. In an electric motor, a rotatable armature including windings, and a combined commutator and lead support element disposed axially of said windings, said element comprising conductive segments embedded in a block of insulating material to form a commutator, and a rigid insulating band integrally formed with the material of said block and extending between said commutator and said windings; lead wires extending from the windings past the cylindrical band to the conductive segments; and means for binding the lead wires against the insulating band to prevent dislocation of said wires.

5. In an electric motor, a rotatable armature, including a disc commutator having lead connection points spaced radially from its center of rotation, said armature including windings disposed axially of said commutator and having an end portion of reduced diameter projecting towards the commutator; a cylindrical band of rigid insulating material; means rigidly securing the band to the commutator between the said commutator and windings, said band having a portion which surrounds the end portion of reduced diameter; lead wires extending from the windings past the cylindrical band to said connection points, and means for binding the lead wires against the insulating band to prevent dislocation of said wires.

WILLIAM F. ALLENBY.

REFERENCES CITED

The following references are of record in the file of this patent:

UNITED STATES PATENTS

| Number | Name | Date |
| --- | --- | --- |
| 2,188,170 | Zschau | Jan. 23, 1940 |
| 2,283,808 | Humphrey | May 19, 1942 |